Jan. 19, 1937.  A. ENGEL  2,068,266

TIRE VALVE

Filed March 23, 1932

Inventor
Abraham Engel,
By his Attorneys,
Fraser, Myers & Manley

Patented Jan. 19, 1937

2,068,266

UNITED STATES PATENT OFFICE 2,068,266

TIRE VALVE

Abraham Engel, New York, N. Y., assignor to A. Schrader's Son, Incorporated, Brooklyn, N. Y., a corporation of New York Application March 23, 1932, Serial No. 600,615

1 Claim. (Cl. 152—12)

The present invention relates to tire valves and aims to provide certain improvements therein. More particularly it relates to what are known as top repair tire valves wherein the tire valve inside mechanism is inserted into and removed from the tire valve stem through the opening in the top thereof.

Tire valves in almost universal use at the present time are of the top repair type and comprise a valve stem and a valve insides that is insertable into and removable from the stem as a unit and are fitted with a valve cap which provides both a secondary seal for the valve insides and a means for excluding foreign matter from gaining entrance into the valve stem. The valve cap also gives a more finished appearance to the valve stem. The valve cap, however, must be removed every time one desires to inflate, deflate or gauge the pressure within a tire, and frequently the cap is not replaced or is mislaid, with the consequent result that its functions on the valve stem are not otherwise taken care of. Also, on those tires on trucks and buses which overlie the brakedrum, the valve stems and valve caps become so hot as to require the use of gloves or pliers for their removal, which, of course, is not conducive to efficiency in operation or such as to encourage their replacement upon the valve stems after being removed.

In view of the foregoing objections it has been proposed to substitute for the conventional valve cap, what is commonly known as an inflating valve cap, that is, a cap member adapted to be screwed onto the valve stem and containing a self-closing check valve therein adapted to be unseated by the deflating pin of a pump coupling or the like, and, in turn, unseat the valve check within the valve stem. These inflating valve caps have met with various degrees of success but are costly and unnecessarily add to the length and weight of the tire valve stem.

According to my present invention I provide the conventional valve stem with means for excluding foreign matter from gaining access to the valve insides and for inflating, deflating and gauging the tire directly through said means without any physical removal or adjustment of parts. Preferably the means I employ is made a part of the tire valve insides unit and is attached to the valve stem simultaneously with the insertion thereinto of said valve insides. My invention also contemplates other features of novelty, which will be understood from the detailed description which follows.

In the accompanying drawing, which shows several embodiments of my invention:—

Figure 5:
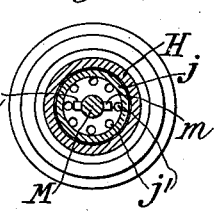
Figure 6:
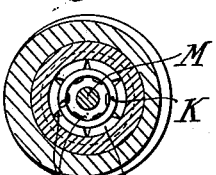
Figure 4:
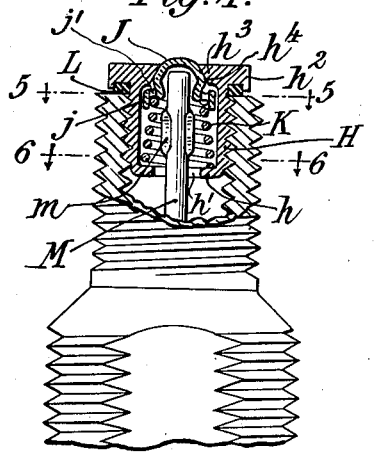
Fig. 4 is a fractional elevation of the top of a valve stem with parts thereof broken away and showing still another embodiment of my invention.

Figs. 5 and 6 are transverse sections taken substantially along the planes of the lines 5—5 and 6—6, respectively, of Fig. 4.

Figure 1:
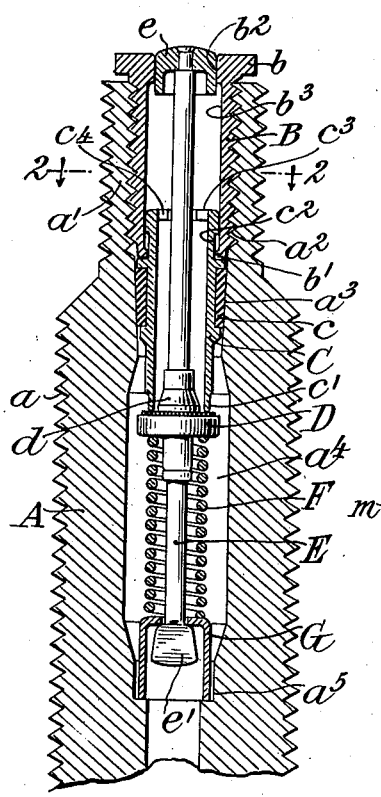
Figure 1 is a longitudinal section through a tire valve stem showing my invention applied thereto.
Figure 2:
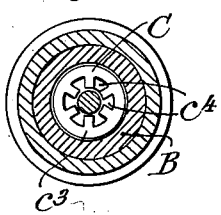
Fig. 2 is a transverse section taken substantially along the plane of the line 2—2 of Fig. 1.

Referring first to Figs. 1 and 2 of the drawing, let A indicate a conventional tire valve stem which is externally screw-threaded, as indicated at $a$, and formed with a reduced externally-threaded nipple portion $a'$. The stem is formed with an axial bore extending longitudinally therethrough, said bore at the nipple end of the stem being internally screw-threaded, as indicated at $a^2$ and formed below said screw-threaded portion with a tapered or conical seat or shoulder $a^3$, below which, in turn, the bore has its diameter increased to provide an enlarged valve chamber $a^4$, at the lower end of which the bore is again reduced to provide a shoulder $a^5$. The valve stem as thus described is that of standard construction in almost universal use at the present time.

Fitted within the valve stem A is a valve insides consisting of an externally screw-threaded plug B, a valve seat member C, a valve check D, a valve pin E upon which the valve check is fixedly mounted and carried, a valve spring F, and a valve spring cup or supporting member G.

The plug B is formed at its outer end with an outwardly-extending flange $b$ which may be peripherally knurled to provide for better finger-gripping engagement therewith. At its inner end the plug is turned or spun inwardly, as indicated at $b'$, for a purpose which will presently be made apparent. The bore through the plug is of somewhat smaller diameter at its outer end, as indicated at $b^2$, than is said portion $b^3$ below said outer end.

The seat member C is provided on its exterior intermediate its ends with a conventional tapered packing $c$ for engagement upon the shoulder $a^3$. At its inner end it is formed with a feathered edge valve seat $c'$, and in proximity to its outer end it is formed with an external annular groove $c^2$, within which the inturned lip $b'$ on the plug B engages to provide a swivel connection between the plug B and seat member C. At its outermost end it is formed with an inwardly-directed flange $c^3$ having an internal diameter such as to provide a guide for the valve pin E, and said flange is formed with radial cut-out portions or openings $c^4$ to provide more rapid ingress and egress of fluid through the seat member.

The valve check D may be of any preferred construction and is provided above its seating face with a tapered enlargement $d$ for assisting in guiding and centrally positioning the valve against the seat C. For normally pressing the valve check into engagement with its seat, the spring F is provided which encircles the valve pin E below the valve check, in the conventional manner.

The valve pin E is of a length to project slightly beyond the outer end of the plug B when the valve is seated, and at said outer end is provided with a dome-shaped enlargement $e$ having a cylindrical wall which slidably engages within the opening $b^2$ in the outer end of the plug and normally provides a substantial closure therefor. The enlargement $e$, as shown, is riveted to the outer end of the pin E, but it will be apparent that said union of parts can be provided in any other equivalent manner. To hold the various valve insides parts in assembled relation so as to be handled as a unit, the inner end of the pin E which passes through the spring cup G, is enlarged, as indicated at $e'$.

Figure 3:
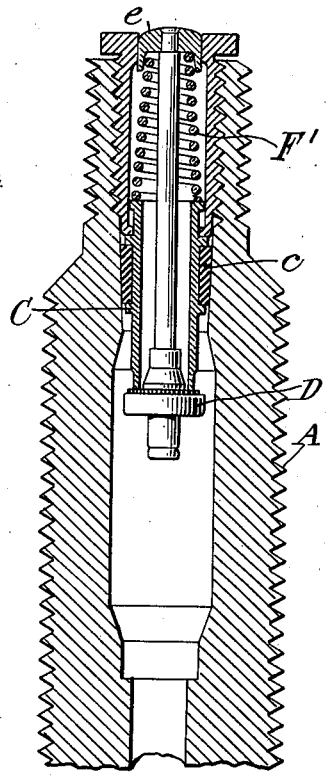
Fig. 3 is a view similar to Fig. 1, showing a second adaptation of my invention.

In the modification shown in Fig. 3, the construction and arrangement of the parts are substantially the same as those shown in Fig. 1 excepting that the valve spring F' is housed within the plug of the valve insides and is shown as bearing at one end against the underside of the dome-shaped enlargement $e$, and at its other end against the top of the seat member C. Obviously the spring F' may be otherwise mounted within the valve insides to hold the valve check against its seat.

From a consideration of the constructions shown in Figs. 1 to 3 it will be apparent at a glance that the valve insides can be readily inserted into and removed from a valve stem as a unit by simple manipulation of the finger-engaging flange $b$ on the plug. If a tighter engagement than that possible of attainment by the fingers is desired, it is obvious that the flange $b$ may be provided with wrench-engaging surfaces, or a pair of pliers may be used therewith. When the valve insides is assembled within the stem, the outer end of the latter, it will be noted, is substantially closed by the dome-shaped enlargement $e$ which has sliding contact with the bore at the outer end of the plug, and that, upon applying a pump coupling, pressure gauge or the like to the outer end of the valve stem, the enlargement $e$ will be depressed into the plug B below the wall $b^2$ thereof to permit the free ingress and egress of fluid through the valve stem. The enlargement $e$, it will also be noted, gives a finished appearance to the valve stem construction.

In the embodiment of my invention shown in Figs. 4 to 6, the conventional valve cap is dispensed with, and as a substitute therefor I provide a construction which not alone has the characteristics and functions of a valve cap, but also permits inflation, deflation and engaging of the tire directly therethrough. As shown, it consists of an externally screw-threaded bushing H formed at its inner end with an inwardly-directed lip or flange $h$ provided with radial openings or recesses $h'$, and at its outer end with both an outwardly-directed flange $h^2$ adapted for finger engagement, and an inwardly-directed flange $h^3$ provided with a tapered or conical valve seating face $h^4$. Adapted to engage against said seating face and provide a leak-tight seal therewith is a valve member J formed of suitable material, said valve having an outer conical or spherical surface and provided at its underside with an outwardly and downwardly-directed annular flange $j$ adapted for sliding engagement with the inner wall of the bushing H for guiding the valve in its movements to and from its seat. The flange $j$ is provided with openings $j'$ to promote the passage of fluid past it when the valve is unseated. To normally hold the valve against its seat there is provided a coil spring K which bears at one end against the flange $j$ and at its other end against the flange $h$. To provide a seal against leakage of air through the cap which might find its way past the tire valve proper, I provide a packing washer L on the underside of the flange $h^2$ for engagement with the top of the valve stem. It will be apparent that the inner diameters of the flange $h$ and the spring K are such as to permit free movement therein of the valve pin M and the enlargement $m$ thereon.

The device shown in Fig. 4, it will be apparent, is a self-contained unit and may be readily applied to any conventional valve stem, and when so applied will provide the customary seal at the outer end of the valve stem, the finished appearance of the valve stem, and also permit of the inflation, deflation and engaging of the tire therethrough, for, upon depressing the valve J, it will engage and depress the valve pin M to unseat the valve check within the valve stem to provide free ingress and egress of fluid through the stem and device. This passage of fluid is facilitated by the openings $h'$ and $j'$ in the flanges $h$ and $j$, respectively.

While I have shown and described several embodiments of my invention it is to be understood that I do not wish to be limited to the details of construction disclosed, since it will be apparent to one skilled in the art that the same may be modified without departing from the spirit of my invention.

The specific embodiment of my invention illustrated in Figs. 4, 5 and 6, is not claimed herein and constitutes the subject-matter of my divisional application, Serial No. 26,399, filed June 13, 1935.

What I claim is:

A top repair tire valve comprising a casing having a shoulder therein, a hollow plug having a seating face engaging said shoulder and a seat for a check valve, means for engaging said plug for holding said seating face against said shoulder, said means comprising a tubular member having an enlarged bore below its outer end, a check valve engageable with the seat on the hollow plug and having a valve pin extending through the tubular member and means slidably engaging within the opening in the top of the tubular member providing a sliding closure therefor and adapted upon being depressed into the enlarged bore of the tubular member to operate through the valve pin to unseat the check valve to provide for ingress and egress of fluid through the casing.

ABRAHAM ENGEL.